(12) United States Patent
Lesperance et al.

(10) Patent No.: US 10,676,193 B2
(45) Date of Patent: Jun. 9, 2020

(54) EXTERNAL LOAD MANAGEMENT FUNCTIONS FOR VERTICAL TAKE-OFF AND LANDING AIRCRAFT

(71) Applicant: SIKORSKY AIRCRAFT CORPORATION, Stratford, CT (US)

(72) Inventors: Jesse J. Lesperance, Harvest, AL (US); Thomas Zygmant, Southport, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 189 days.

(21) Appl. No.: 15/566,282

(22) PCT Filed: Apr. 1, 2016

(86) PCT No.: PCT/US2016/025549
§ 371 (c)(1),
(2) Date: Oct. 13, 2017

(87) PCT Pub. No.: WO2016/167988
PCT Pub. Date: Oct. 20, 2016

(65) Prior Publication Data
US 2018/0099748 A1     Apr. 12, 2018

Related U.S. Application Data

(60) Provisional application No. 62/148,799, filed on Apr. 17, 2015.

(51) Int. Cl.
*B64D 1/22*      (2006.01)
*B64C 29/00*     (2006.01)
(Continued)

(52) U.S. Cl.
CPC .............. *B64D 1/22* (2013.01); *B64C 27/04* (2013.01); *B64C 29/00* (2013.01); *B64C 39/024* (2013.01);
(Continued)

(58) Field of Classification Search
CPC .. B64D 1/22; B64D 1/02; B64C 27/04; B64C 29/00; B64C 39/024; G05D 1/0858
See application file for complete search history.

(56) References Cited

U.S. PATENT DOCUMENTS 8,532,846 B2    9/2013   Tollenaere et al.
2007/0200032 A1   8/2007   Eadie et al.
(Continued)

OTHER PUBLICATIONS

EP 16780455 Supplementary European Search Report dated Oct. 4, 2018, 9 pages.
(Continued)

*Primary Examiner* — Michael D Lang
(74) *Attorney, Agent, or Firm* — Cantor Colburn LLP

(57) ABSTRACT

According to an aspect, a system in an aircraft includes a vehicle management system (VMS) and a load control system (LCS). The LCS includes an LCS processor operable to receive and transmit a plurality of data and load management commands to one or more of: the VMS and a load control interface. The LCS processor is further operable to interact with one or more of: the VMS, one or more LCS sensors, and a load capturing interface of the aircraft to execute the load management commands as a sequence of one or more load management subcommands. The load capturing interface is operable to capture and release an external load relative to the aircraft using a load capture device. The LCS processor is also operable to report a status of execution of the load management commands to the VMS and the load control interface.

15 Claims, 6 Drawing Sheets

(51) Int. Cl.
*B64D 1/02* (2006.01)
*B64C 39/02* (2006.01)
*B64C 27/04* (2006.01)
*G05D 1/08* (2006.01)
*B64D 47/08* (2006.01)

(52) U.S. Cl.
CPC ............ *B64D 1/02* (2013.01); *G05D 1/0858* (2013.01); *B64C 2201/024* (2013.01); *B64C 2201/128* (2013.01); *B64C 2201/141* (2013.01); *B64C 2201/146* (2013.01); *B64D 47/08* (2013.01)

(56) References Cited

U.S. PATENT DOCUMENTS

| | | |
|---|---|---|
| 2008/0071431 A1 | 3/2008 | Dockter et al. |
| 2010/0222993 A1 | 9/2010 | Brainard et al. |
| 2013/0054054 A1* | 2/2013 | Tollenaere ............... B64D 1/22 701/3 |
| 2013/0240673 A1 | 9/2013 | Schlosser et al. |
| 2013/0248648 A1 | 9/2013 | Lesperance et al. |

OTHER PUBLICATIONS

PCT/US2016/025549 Search Report and Written Opinion, dated Jul. 1, 2016, 17 pages.

* cited by examiner

EXTERNAL LOAD MANAGEMENT FUNCTIONS FOR VERTICAL TAKE-OFF AND LANDING AIRCRAFT

CROSS REFERENCE TO RELATED APPLICATIONS

This application is a National Stage application of PCT/US2016/025549, filed Apr. 1, 2016, which claims the benefit of U.S. Provisional Application No. 62/148,799, filed Apr. 17, 2015, both of which are incorporated by reference in their entirety herein.

BACKGROUND OF THE INVENTION

The subject matter disclosed herein relates to load-management systems in a vertical take-off and landing (VTOL) aircraft, and more particularly, to external load management functions for VTOL aircraft.

Typically, a utility VTOL aircraft's ability to carry cargo is one of its most important features. The VTOL aircraft, e.g., a helicopter, can typically be equipped to carry large, long, or oddly shaped cargo on an external sling provided that the cargo is within the lifting capacity of the aircraft. A significant advantage associated with this lifting capability is that a load may be picked up from or delivered to locations where access by other forms of transportation is difficult or impossible. Additionally, the VTOL aircraft is not required to land to deliver or pick up the cargo.

In external cargo operations, picking up, or delivering cargo typically requires three to four people to maneuver the aircraft: a pilot and/or co-pilot, a crew chief (if cabin equipped), and a load master (on the ground) work together to maneuver the aircraft into place for attaching a sling to external cargo during picking up and/or providing directions to avoid obstacles during pickup/delivery of the cargo. Prior and during the pickup/delivery, the crew can establish certain parameters of the external load required by the pilot(s) for flight and subsequent pickup/delivery.

An autonomous VTOL aircraft can include manned aircraft (e.g., optionally piloted vehicles) and unmanned aircraft (e.g., unmanned air systems). In an unmanned VTOL aircraft, there is no flight crew to coordinate these maneuvers for delivery and pickup of loads. Attempting to control external cargo pickup, release, and other maneuvers presents a number of challenges in autonomous VTOL aircraft.

BRIEF SUMMARY

According to an embodiment of the invention, a system in an aircraft includes a vehicle management system (VMS) and a load control system (LCS). The LCS includes an LCS processor operable to receive and transmit a plurality of data and load management commands to one or more of: the VMS and a load control interface. The LCS processor is further operable to interact with one or more of: the VMS, one or more LCS sensors, and a load capturing interface of the aircraft to execute the load management commands as a sequence of one or more load management subcommands. The load capturing interface is operable to capture and release an external load relative to the aircraft using a load capture device. The LCS processor is also operable to report a status of execution of the load management commands to the VMS and the load control interface.

In addition to one or more of the features described above or below, or as an alternative, further embodiments could include where the load capture device is a cargo hook interface operable to control a cargo hook with a sling attached. In response to receiving a release-sling command as one of the load management commands, the VMS can perform an altitude decrease subcommand based on determining that the aircraft is above an acceptable release height according to one or more aircraft sensors and sends a cargo-hook-open subcommand via the LCS to open the cargo hook upon confirmation from the one or more aircraft sensors that the aircraft is at or below the acceptable release height.

In addition to one or more of the features described above or below, or as an alternative, further embodiments could include one or more LCS sensors operable to detect one or more parameters of the external load as one or more of: a position of the external load, a weight of the external load, and a distance of the external load below the aircraft.

In addition to one or more of the features described above or below, or as an alternative, further embodiments could include where in response to receiving a position-over-load command as one of the load management commands, the LCS processor uses the one or more LCS sensors to locate and identify coordinates of the external load; and in response to locating the external load. The LCS processor can send the coordinates of the external load to the VMS to reposition the aircraft over the coordinates of the external load.

In addition to one or more of the features described above or below, or as an alternative, further embodiments could include where in response to receiving a lift-load command as one of the load management commands, the LCS processor confirms attachment of the load capture device with the external load and sends a completion status that prompts the VMS to command an altitude increase of the aircraft.

In addition to one or more of the features described above or below, or as an alternative, further embodiments could include where the load capture device is an LCS capture device. In response to receiving a release-load command as one of the load management commands, the VMS can perform an altitude decrease subcommand based on determining that the aircraft is above an acceptable release height and sends a capture-device-open subcommand to the LCS processor upon confirmation from one or more aircraft sensors that the aircraft is at or below the acceptable release height. The LCS processor can send the capture-device-open subcommand to the LCS capture device to release the external load.

In addition to one or more of the features described above or below, or as an alternative, further embodiments could include where in response to receiving a hook-load command as one of the load management commands, the VMS performs a decrease altitude subcommand and monitors the LCS for engagement of the load capture device with the external load and the one or more LCS sensors for the position of the external load or other parameters.

In addition to one or more of the features described above or below, or as an alternative, further embodiments could include where in response to receiving a pickup-load command as one of the load management commands, the VMS decomposes the pickup-load command into a pickup load sequence including a position-over-load command, a hook-load command, and a lift-load command, and executes the pickup-load sequence.

In addition to one or more of the features described above or below, or as an alternative, further embodiments could include where in response to receiving a drop off-load command as one of the load management commands while the aircraft possesses the external load, the VMS decomposes the drop off-load command into a drop-off load sequence including completing a repositioning sub-command to a pre-determined drop off location and performing a release-sling command or a release-load command.

In addition to one or more of the features described above or below, or as an alternative, further embodiments could include where the report of the status of execution includes transmission of one or more of a text message and an encoded status indicator to the load control interface, and the load control interface is a control station or a pilot interface.

According to another embodiment of the invention, a load control interface that includes a user interface operable to receive user selections and a processing system. The processing system is operable to detect a user selection of one or more selectable load management commands associated with an external load of an aircraft, and transmit a load management command to one or more of a load control system (LCS) and a vehicle management system (VMS) of the aircraft based on the detected user selection of one of the selectable load management commands, wherein each of the selectable load management commands comprises a single action or a sequence of actions to be performed by one or more of the LCS and the VMS of the aircraft.

In addition to one or more of the features described above or below, or as an alternative, further embodiments could include where the selectable load management commands includes one or more of: a position-over-load command to locate the external load and position the aircraft over coordinates of the external load; a hook-load command to lower a load capture device of the aircraft and engage the load capture device with the external load; a lift-load command to confirm attachment of the load capture device with the external load and increase altitude of the aircraft based on confirmation of the attachment of the load capture device with the external load; a pickup-load command to command execution of a pickup load sequence including the position-over-load command, the hook-load command, and the lift-load command; a release-sling command to open a cargo hook of the aircraft at or below an acceptable release height; a release-load command to open an LCS capture device of the aircraft at or below the acceptable release height; and a drop off-load command to command execution of a drop off-load sequence including completing a repositioning sub-command to a pre-determined drop off location and performing a release-sling command or a release-load command.

In addition to one or more of the features described above or below, or as an alternative, further embodiments could include where a status of execution of the selected one of the selectable load management commands that is received from one or more of the LCS and VMS is displayed on the user interface, and the status of execution of the load management command comprises one or more of a text message and a graphical symbol displayed on the user interface.

In addition to one or more of the features described above or below, or as an alternative, further embodiments could include where the processing system is operable to receive a mode of operation of the aircraft, command a change in the mode of operation of the aircraft, and modify an aspect of the user interface based on detecting the change in the mode of operation of the aircraft.

In addition to one or more of the features described above or below, or as an alternative, further embodiments could include where the load control interface is implemented in a control station that is external to the aircraft or is a pilot interface of the aircraft.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION OF THE INVENTION

Embodiments control actions of a VTOL aircraft using a load control interface to perform external load maneuvers. The load control interface can be embodied in a control station that is external to the VTOL aircraft or as a pilot interface on a manned/optionally piloted VTOL aircraft. The load control interface can provides a user interface for optionally piloted or unmanned VTOL aircraft to reduce operator workload for manual, semi-automated, and automated external loads. The user interface can provide a set of command functions as selectable load management commands that automate a sequence of discrete functions to control external load maneuvers. Based on detecting a selection of a selectable load management command, the load control interface transmits a command or sequence of commands to a load control system (LCS) and/or vehicle management system (VMS) of the VTOL aircraft to implement the desired action or actions. The automation provided by the command functions can reduce required communication between ground crews (operator and rigging crew) during hook-up and release phases of external load maneuver operations.

Figure 1:
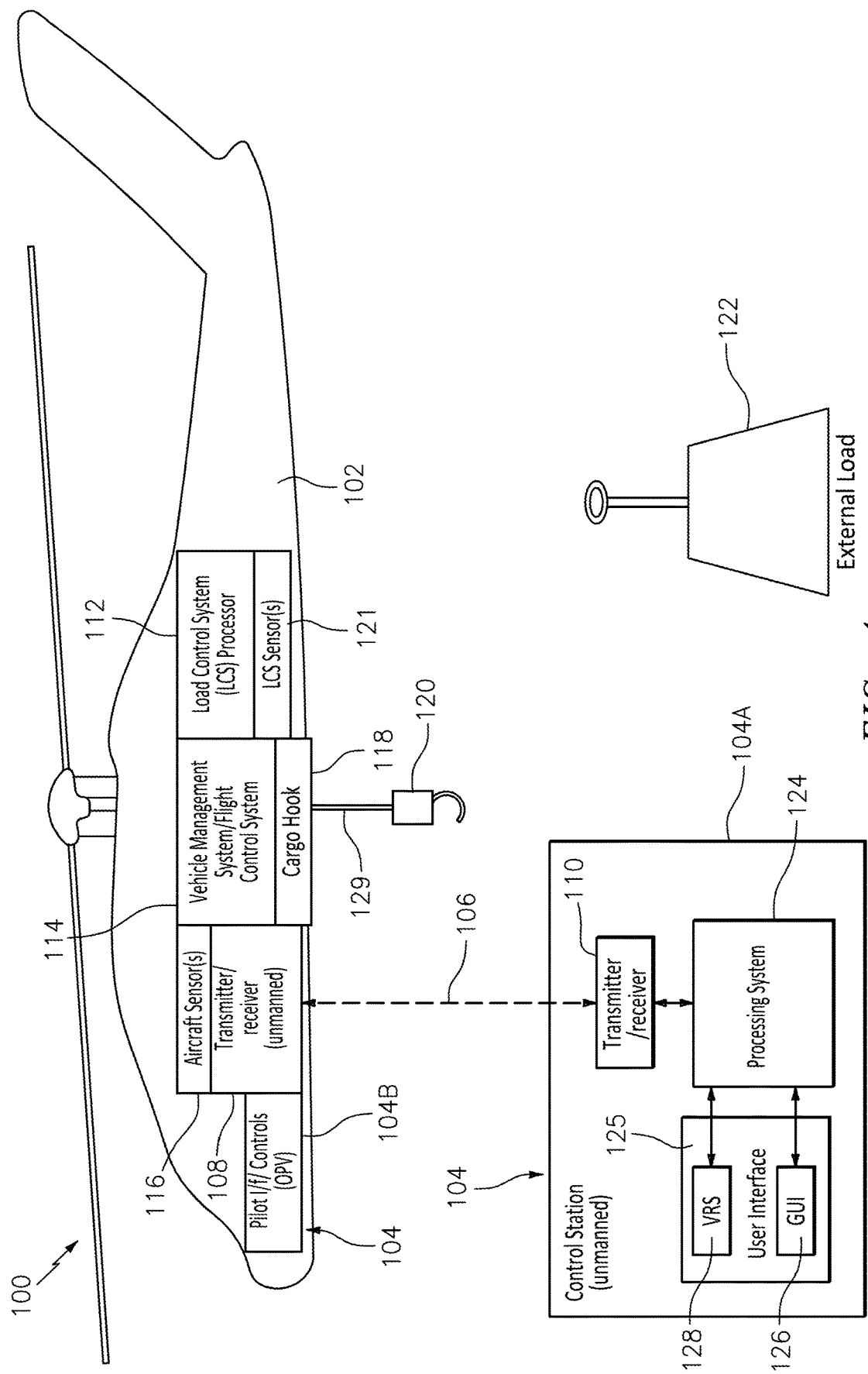
FIG. 1 illustrates a schematic block diagram of a system including a VTOL aircraft and a control station in accordance with an embodiment of the invention.

Referring to the drawings, FIG. 1 illustrates a schematic block diagram of a system 100 to automate external load management functions for a VTOL aircraft 102 using a control station 104A as one example of a load control interface 104 in accordance with an exemplary embodiment. VTOL aircraft 102 can include a manned autonomous vehicle as well as an unmanned autonomous vehicle. The load control interface 104 can be a ground-based control, a vehicle-based control, or a handheld control (e.g., a man-portable unit) that transmits commands and receives feedback on a datalink 106 with respect to systems of the VTOL aircraft 102. The VTOL aircraft 102 can include a transmitter and receiver 108 that communicates with a transmitter and receiver 110 of the control station 104A on the datalink 106 using any wireless communication protocol known in the art for unmanned embodiments. In an embodiment where the load control interface 104 is located on the VTOL aircraft 102 as a pilot interface 104B, the datalink 106 can be a wired, optical, or wireless link. As one example, interoperability between the VTOL aircraft 102 and the control station 104A can be implemented in compliance with NATO Standardization Agreement 4586 for the datalink 106, command and control, and human/computer interfaces. For an aircraft-based control unit via pilot interface 104B, this can be a wired or optical connection.

As depicted in the example of FIG. 1, the VTOL aircraft 102 can include an LCS processor 112 that may interface directly or indirectly with the transmitter and receiver 108 to process external load function commands from the control station 104A, as well as to provide feedback to the control station 104A. The LCS processor 112 can interface directly or indirectly with vehicle management system/flight control system (referred to as VMS) 114, aircraft sensors 116, a cargo hook 118, and/or LCS sensors 121. The LCS processor 112 may also interface with pilot interface 104B as the load control interface 104 in an optionally piloted vehicle embodiment. Although depicted separately a portion or all of the LCS processor 112 can be implemented in the VMS 114, where VMS 114 can include a vehicle management system with a corresponding flight control system. Responsive to one or more load management commands, the LCS processor 112 can request that the VMS 114 alter a position and/or orientation of the VTOL aircraft 102. The aircraft sensors 116 include flight control related sensors, and the LCS sensors 121 include external load management related sensors. For example, aircraft sensors 116 and/or the LCS sensors 121 can include LIght Detection And Ranging (LIDAR), LAser Detection And Ranging (LADAR), Radio Detection And Ranging (RADAR) altimeter, cameras, gyroscopes, accelerometers, positional sensors, an inertial measurement unit (IMU), or the like. The cargo hook 118 may be opened and closed to hook or release an external load 122. The cargo hook 118 may be coupled to a sling 129 and/or an LCS capture device 120. Thus, a load capture device may be a conventional cargo hook, a cargo hook with a sling, or a more advanced pendant that includes one or more of the LCS sensors 121.

To assist with implementing the load management commands, the LCS processor 112 in conjunction with the VMS 114 may use aircraft sensors 116, such as infrared cameras, video cameras, or radar type sensors, with focused beams on the ground and the external load 122 to identify and gather information about the position (i.e., coordinates) of external load 122 with respect to VTOL aircraft 102, and may gather data related to geographical terrain at and around the external load 122. Sensor information from aircraft sensors 116 can also be used for path planning of VTOL aircraft 102. Additional navigation systems on VTOL aircraft 102 can include GPS or the like to provide enhanced positional awareness for VTOL aircraft 102. The LCS processor 112 and/or VMS 114 may also receive real-time force information from one or more LCS sensors 121 such as, for instance, strain gauge load cells embedded in a pendant at an end of the LCS capture device 120 to provide sensor information related to weight and load. Although only a single LCS capture device 120 is depicted in FIG. 1, it will be understood that VTOL aircraft 102 can include more than one cargo hook 118 and more than one LCS capture device 120, one or more of which may include LCS sensors 121.

In addition to the transmitter and receiver 110, the control station 104A can include a processing system 124 that enables a user to make user selections and view data through a user interface 125, such as a graphical user interface (GUI) 126 with inputs via a touchscreen or a hardware interface (e.g., one or more joysticks, buttons, knobs, etc.), and/or using voice recognition software (VRS) 128. The GUI 126 may be displayed on a monitor that enables selection of the selectable load management commands associated with the external load 122 using keyboard input, touchpad input, buttons, mouse-based input, and/or gesture recognition. Input to the VRS 128 may be received via a headset or other microphone-based input. The processing system 124 may include any type of processor and memory to hold instructions in a non-transitory form for execution by the processing system 124. The pilot interface 104B can include similar features as the control station 104A but may be integrated into existing controls of the VTOL aircraft 102, such as an existing multi-function display.

Further with respect to FIG. 1, it will be understood that various elements can be further combined or subdivided. For example, one or more of the LCS sensors 121 can be part of the LCS processor 112. The LCS processor 112 can be a partition of the VMS 114. The LCS processor 112 may be part of the load capture device 120. One or more of the aircraft sensors 116 can be integrated with the VMS 114.

Figure 2:
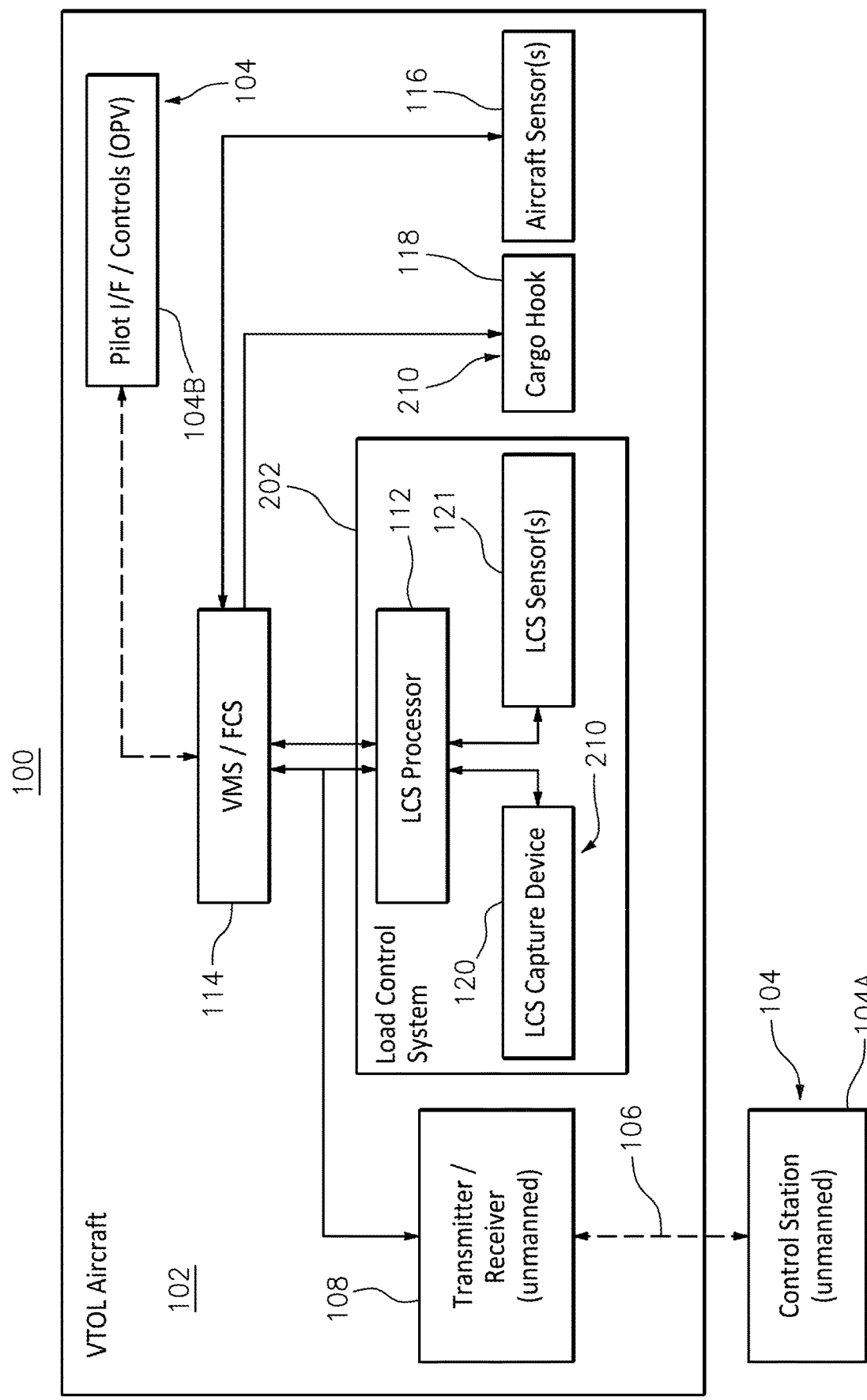
FIG. 2 is a block diagram of the system of FIG. 1 illustrating additional communication details in accordance with an embodiment of the invention.

FIG. 2 is a block diagram of the system 100 of FIG. 1 illustrating additional communication details in accordance with an embodiment. FIG. 2 is described in further reference to FIG. 1. In the example of FIG. 2, the transmitter and receiver 108 is coupled to the VMS 114. FIG. 2 depicts details of an LCS 202, which may include the LCS processor 112, the LCS capture device 120, and one or more LCS sensors 121. In embodiments that have automated or semi-automated load acquisition, the LCS capture device 120 and LCS sensors 121 may be populated and utilized, where the LCS capture device 120 is one type of a load capture device 210. In embodiments where the load capture device 210 is a conventional cargo hook, the cargo hook 118 with or without the sling 129 of FIG. 1 may be used to deploy and/or release load capturing. The cargo hook 118 and LCS capture device 120 may each be generally referred to as a load capture device 210.

The LCS processor 112 can execute instructions for processing load management command from a load control interface 104, such as the control station 104A or pilot interface 104B, as a sequence of one or more load management subcommands to maneuver VTOL aircraft 102 for automated external load or cargo delivery for VTOL aircraft 102. Sensor data from the LCS sensors 121 may be received at the LCS processor 112 in real-time to determine information about the external load 122 relative to VTOL aircraft 102. The LCS sensors 121 and/or aircraft sensors 116 can be used to detect one or more parameters of the external load 122, such as distance between the VTOL aircraft 102 and the external load 122 of FIG. 1 and/or identification using visual recognition or tags (e.g., a radio frequency ID). The LCS sensors 121 may also detect weight and/or position of the external load 122. With respect to positioning, sensor information data received by the LCS processor 112 can include a current geographical location of VTOL aircraft 102, height on top of the external load 122 of FIG. 1 above ground level, and/or distance of VTOL aircraft 102 to a pendent at an end of a sling 129.

LCS processor 112 can include memory and at least one processing circuit. Memory of the LCS processor 112 may store executable instructions that are executed by the LCS processor 112. LCS processor 112 may be any type of processor such as a central processing unit (CPU) or a graphics processing unit (GPU), including a general purpose processor, a digital signal processor (DSP), a microcontroller, an application specific integrated circuit (ASIC), a field programmable gate array (FPGA), or the like.

The LCS processor 112 can send vehicle control subcommands to VMS 114 to control repositioning and changes in altitude of the VTOL aircraft 102 based on one or more load management commands. VMS 114 may provide directives based on, e.g., navigating, and/or maneuvering VTOL aircraft 102 during a plurality of flight states such as, e.g., initial descent state for picking-up cargo, lift state after cargo has been acquired, and delivery descent state for delivering cargo to a location and releasing the load capture device 210. The directives may be presented on one or more input/output (I/O) devices, such as a display device or screen, audio speakers, a GUI, etc. For a manned VTOL aircraft 102, I/O devices can be located on the VTOL aircraft 102 while for an unmanned VTOL aircraft 102, I/O devices may be remotely located from VTOL aircraft 102, for example, in the control station 104A. It is to be appreciated that the system 100 is illustrative. In some embodiments, additional components or entities not shown in FIG. 2 may be included. In some embodiments, one or more of the components or entities may be optional.

Although a particular configuration of VTOL aircraft 102 is illustrated and described in the disclosed embodiments, it will be appreciated that other configurations and/or machines include autonomous and semi-autonomous aircraft that may operate over land or water including fixed-wing aircraft, tilt rotor, and rotary-wing aircraft may also benefit from embodiments disclosed.

Figure 3:
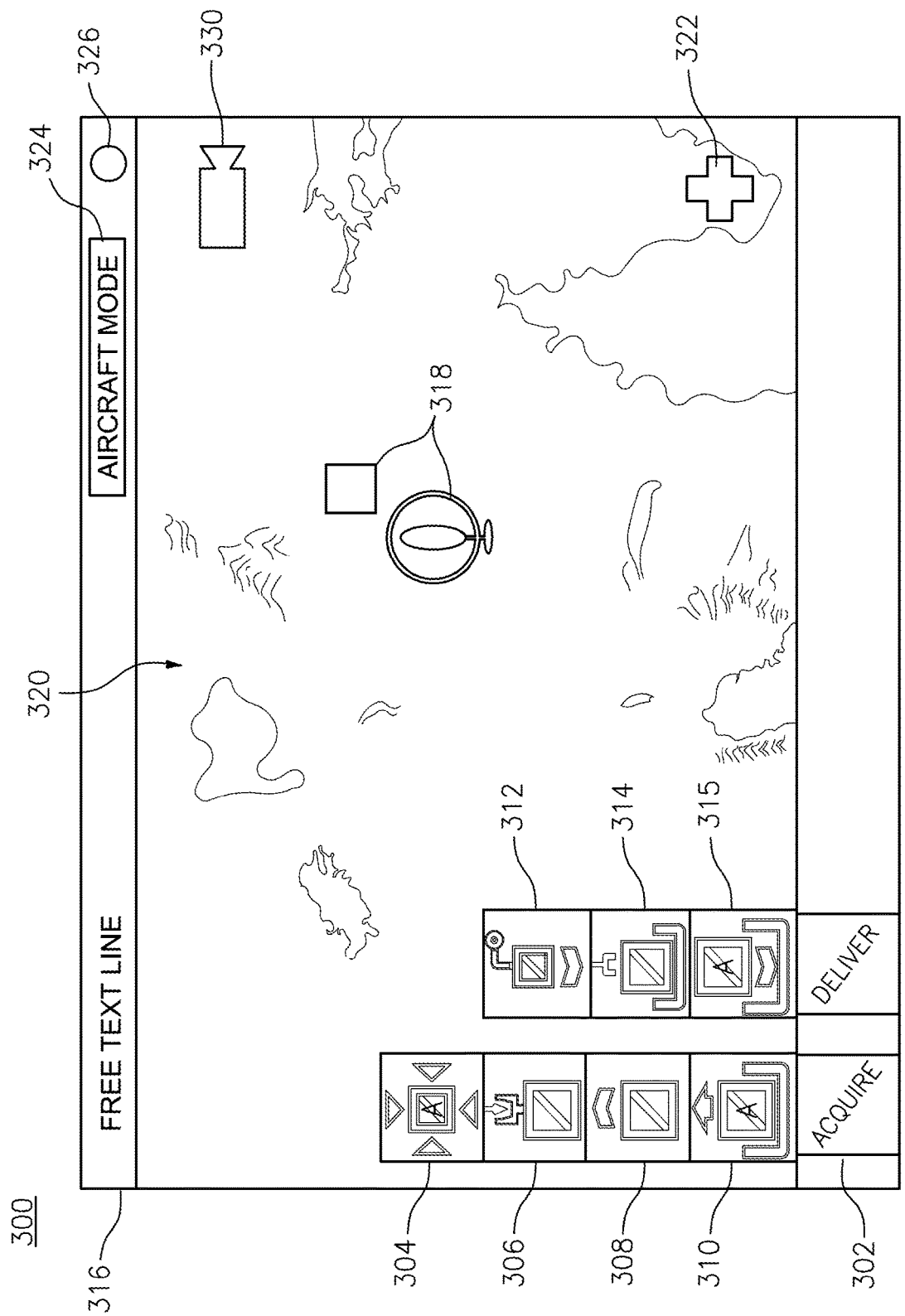
FIG. 3 is a view of a user interface of the control station of FIG. 1 in accordance with an embodiment of the invention.

FIG. 3 is a view of a user interface 300 of the control station 104A of FIG. 1 in accordance with an embodiment of the GUI 126 of FIG. 1 and with further reference to FIGS. 1-3. The user interface 300 can display a plurality of selectable load management commands 302 associated with external load 122. The control station 104A can transmit a load management command to the LCS processor 112 and/or VMS 114 of the VTOL aircraft 102 based on a detected user selection of one of the selectable load management commands 302. In the example of FIG. 3, the user interface 300 includes a position-over-load command 304 to locate the external load 122 and position the VTOL aircraft 102 over coordinates of the external load 122. In response to receiving the position-over-load command 304 as one of the load management commands, the LCS processor 112 can use one or more LCS sensors 121 to locate and identify coordinates of the external load 122. In response to locating the external load 122, the LCS processor 112 may send the coordinates of the external load 122 to the VMS 114 to reposition the VTOL aircraft 102 over the coordinates of the external load 122.

A hook-load command 306 can be sent to lower a load capture device 210 of the VTOL aircraft 102 and engage the load capture device 210 with the external load 122. In response to receiving a hook-load command 306 as one of the load management commands, the VMS 114 performs a decrease altitude subcommand and monitors the LCS 202 for engagement of the load capture device 210 with the external load 122 and the one or more LCS sensors 121 for the position of the external load 122 or other parameters.

A lift-load command 308 can be sent to confirm attachment of the load capture device 210 with the external load 122 and increase altitude of the VTOL aircraft 102 based on confirmation of the attachment of the load capture device 210 with the external load 122. In response to receiving a lift-load command 308 as one of the load management commands, the LCS processor 112 confirms attachment of the load capture device 210 with the external load 122 and sends a completion status that prompts the VMS 114 to command an altitude increase of the VTOL aircraft 102.

A pickup-load command 310 can be sent to command execution of a pickup load sequence including the position-over-load command, the hook-load command, and the lift-load command. In response to receiving a pickup-load command 310 as one of the load management commands, the VMS 114 can decompose the pickup-load command 310 into a pickup load sequence including the position-over-load command, the hook-load command, and the lift-load command, and executes the pickup-load sequence.

A release-sling command 312 can be sent to open a cargo hook of the VTOL aircraft 102 at or below an acceptable release height. The acceptable release height can be based on a fixed constant or set based on load related measurements and sling dimensions. The load capture device 210 may be a cargo hook 118. In response to receiving a release-sling command 312 as one of the load management commands, the VMS 114 performs an altitude decrease subcommand based on determining that the VTOL aircraft 102 is above an acceptable release height according to one or more aircraft sensors 116 and sends a cargo-hook-open subcommand via the LCS 202 to the cargo hook 118 upon confirmation from the one or more aircraft sensors 116 that the VTOL aircraft 102 is at or below the acceptable release height.

A release-load command 314 can be sent to open the LCS capture device 120 of the VTOL aircraft 102 at or below the acceptable release height. The load capture device 210 may be the LCS capture device 120. In response to receiving a release-load command 314 as one of the load management commands, the VMS 114 performs an altitude decrease subcommand based on determining that the VTOL aircraft 102 is above an acceptable release height and sends a capture-device-open subcommand to the LCS processor 112 upon confirmation from one or more aircraft sensors 116 that the VTOL aircraft 102 is at or below the acceptable release height. The LCS processor 112 can send the capture-device-open subcommand to the LCS capture device 120 to release the external load 122.

A drop off-load command 315 can command execution of a drop off-load sequence that includes completing a repositioning sub-command to a pre-determined drop off location and performing a release-sling command or a release-load command. In response to receiving the drop off-load command 315 as one of the load management commands while the VTOL aircraft 102 possesses the external load 122, the VMS 114 decomposes the drop off-load command into a drop-off load sequence that includes completing a repositioning sub-command to a pre-determined drop off location and performing a release-sling command or a release-load command.

The user interface 300 can display received status of execution of a load management command from the LCS processor 112 and/or the VMS 114. For example, a report of the status of execution can be sent from the LCS processor 112 or VMS 114 as a transmission that includes of one or more of a text message and an encoded status indicator to the control station 104A. A text message can be displayed in a free text line 316. An encoded status indicator may be displayed as a graphical symbol 318 displayed on user interface 300. For instance, the graphical symbol 318 may align with a particular feature, such as the coordinates of the external load 122 and the color and/or shape of the graphical symbol 318 may indicate stability, confirmed attachment, load identification, or other such indications. The graphical symbol 318 can be displayed over a map 320 from a map and terrain database. The control station 104A may also receive a video stream from the VTOL aircraft 102, display the video stream on the user interface 300 as accessible by a video icon 330, and display status as an overlay upon the video stream. The control station 104A may also receive a health status of the VTOL aircraft 102 and display the health status on the user interface 300 as accessible by a health menu 322. The control station 104A may also receive a mode of operation of the VTOL aircraft 102 and modify an aspect 324, 326 of the user interface 300 based on detecting a change in the mode of operation of the VTOL aircraft 102.

Aspect 324 of the user interface may be a text-based indication of the current value of the aircraft mode, while aspect 326 may graphically indicate whether a command is presently being executed or has completed (e.g., busy/not busy status). The user interface 300 may also be operable to command a change in the mode of operation of the VTOL aircraft 102. Thus, in addition to load management commands, the load control interface 104 can transmit and receive data to the LCS processor 112 and/or VMS 114, such as aircraft mode commands, information via free text line 316, health, and other status. Alternatively, the user interface need not include visual indicators.

Figure 4:
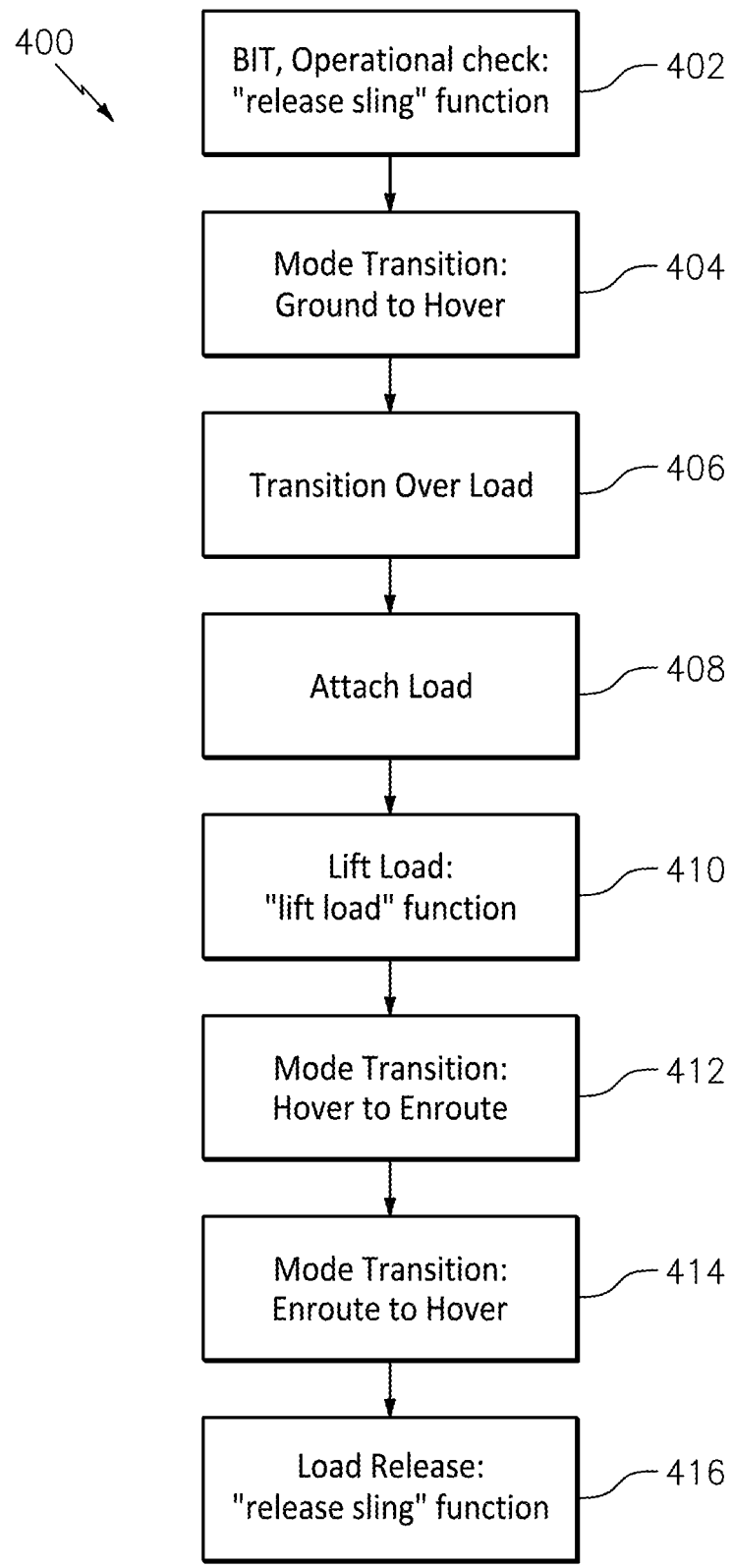
FIG. 4 illustrates a process flow that can be implemented using the system of FIG. 1 in accordance with an embodiment of the invention.

FIG. 4 illustrates a process flow 400 that can be implemented using the system 100 of FIG. 1 in accordance with an embodiment and is described in reference to FIGS. 1-4. The process flow 400 is an example of a sequence of steps for manual load operations, where either the control station 104A or pilot interface 104B can be used as the load control interface 104. At block 402, upon initialization, built-in test of the load control interface 104 can perform an operational check of the VTOL aircraft 102 by sending a release-sling command to the LCS processor 112 to command a release sling function as a test. At block 404, a user of the load control interface 104 can command a mode transition from ground stationary, to hover stationary, to hover-manual control. At block 406, the VTOL aircraft 102 can transition over the external load 122 using a hover operation commanded from the control station 104A or by pilot interface 104B when optionally piloted. At block 408, the external load 122 can be manually attached by a ground crew. At block 410, a user of the load control interface 104 can send a lift-load command to the LCS processor 112 to command a lift load function. At block 412, a mode transition can be commanded from hover-manual control to hover-stationary to enroute as the VTOL aircraft 102 is commanded to a targeted load release site. At block 414, when the VTOL aircraft 102 reaches a targeted load release site, a mode transition can be commanded from enroute to hover stationary to hover-manual control. At block 416, a user of the load control interface 104 can send a release-sling command to the LCS processor 112 to command the release sling function.

Figure 5:
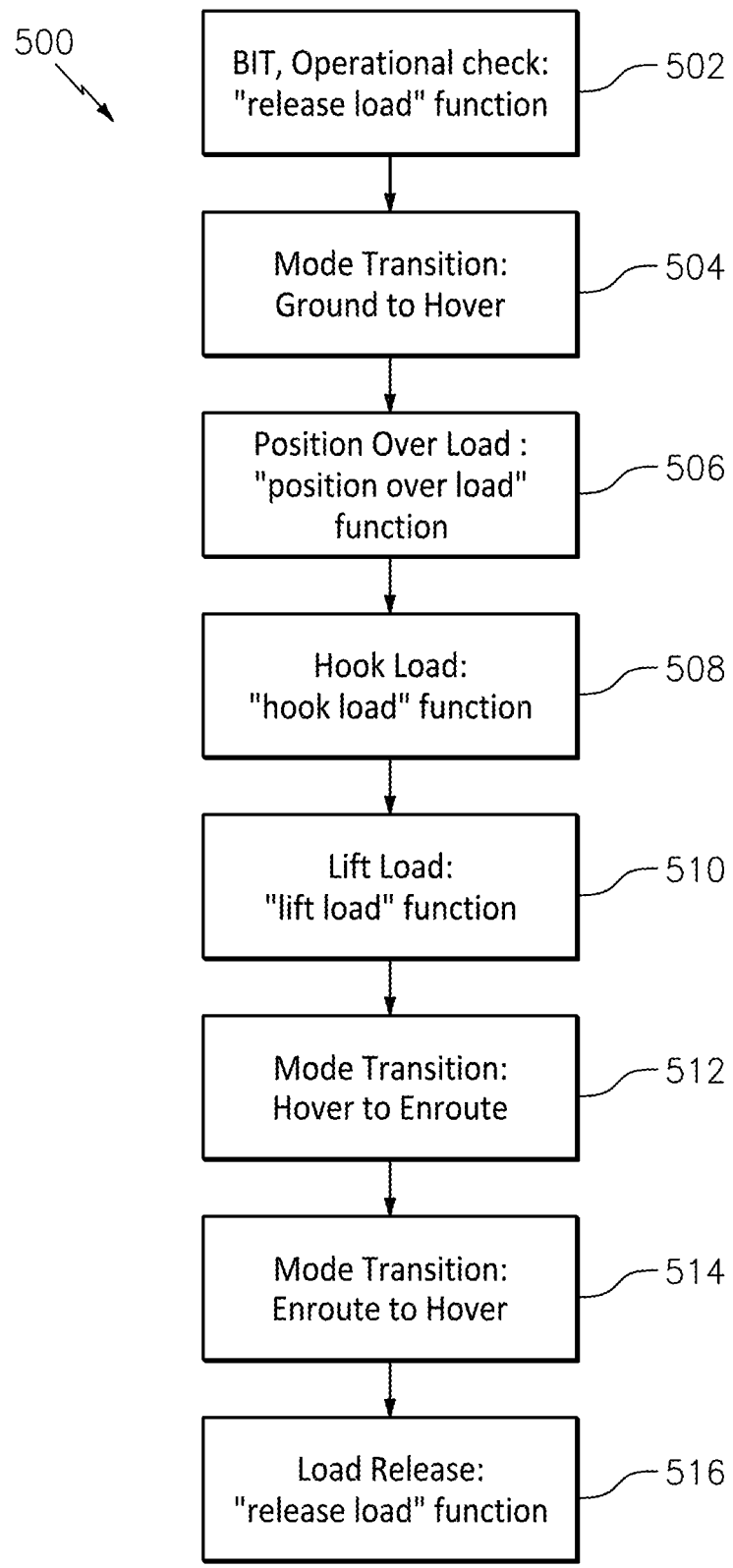
FIG. 5 illustrates another process flow that can be implemented using the system of FIG. 1 in accordance with an embodiment of the invention.

FIG. 5 illustrates a process flow 500 that can be implemented using the system 100 of FIG. 1 in accordance with an embodiment and is described in reference to FIGS. 1-5. The process flow 500 is an example of a sequence of steps for semi-automated load operations, where either the control station 104A or pilot interface 104B can be used as the load control interface 104. At block 502, upon initialization, built-in test of the load control interface 104 can perform an operational check of the VTOL aircraft 102 by sending a release-load command to the LCS processor 112 to command a release load function as a test. At block 504, a user of the load control interface 104 can command a mode transition from ground stationary, to hover stationary, to hover-manual control. At block 506, the VTOL aircraft 102 can be positioned over the external load 122 by sending a position-over-load command from the load control interface 104 to the LCS processor 112 to command a position over load function. At block 508, a user of the load control interface 104 can transmit a hook-load command to the LCS processor 112 to command a hook load function to engage the external load 122. At block 510, a user of the load control interface 104 can send a lift-load command to the LCS processor 112 to command a lift load function. At block 512, a mode transition can be commanded from hover-manual control to hover-stationary to enroute as the VTOL aircraft 102 is commanded to a targeted load release site. At block 514, when the VTOL aircraft 102 reaches a targeted load release site, a mode transition can be commanded from enroute to hover stationary to hover-manual control. At block 516, a user of the load control interface 104 can send a release-load command to the LCS processor 112 to command the release load function.

Figure 6:
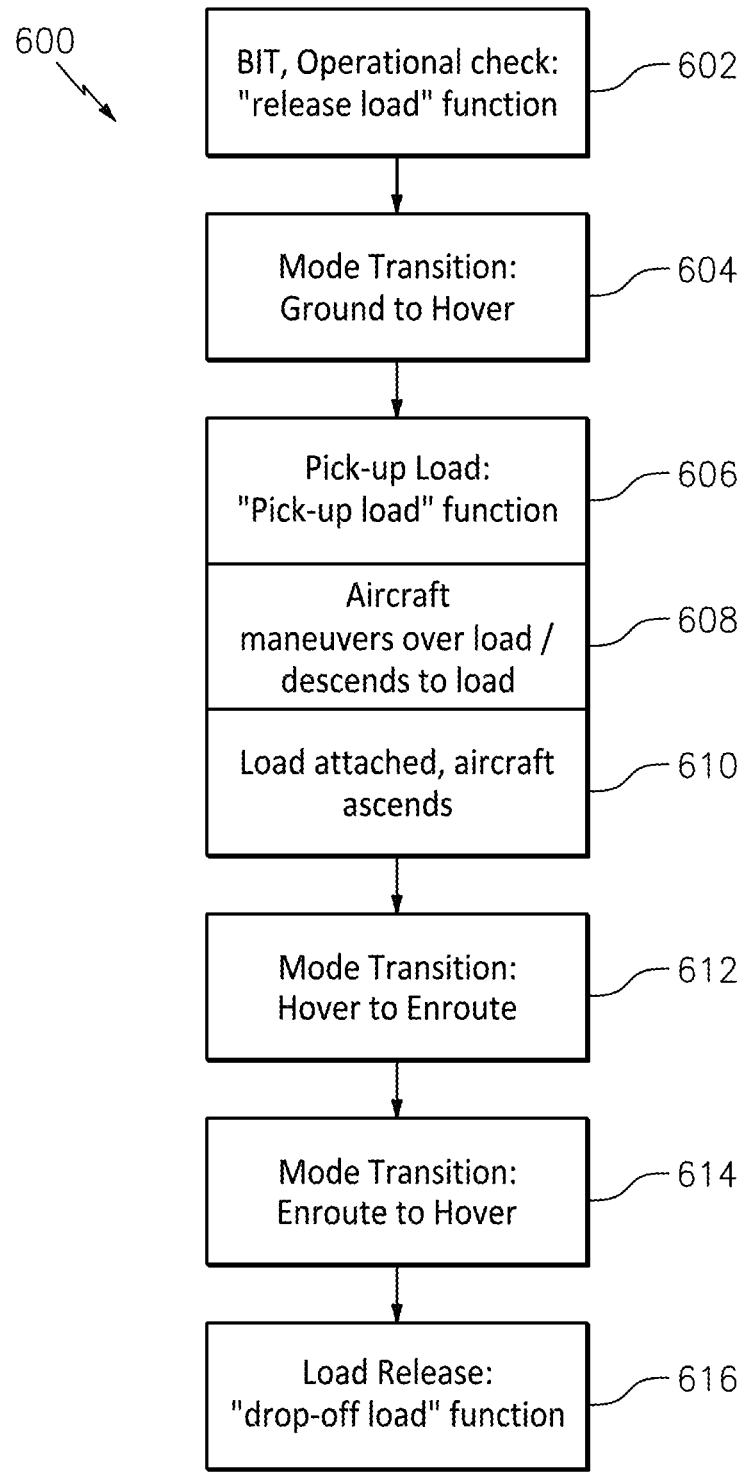
FIG. 6 illustrates a further process flow that can be implemented using the system of FIG. 1 in accordance with an embodiment of the invention.

FIG. 6 illustrates a process flow 600 that can be implemented using the system 100 of FIG. 1 in accordance with an embodiment and is described in reference to FIGS. 1-6. The process flow 600 is an example of a sequence of steps for automated load operations, where either the control station 104A or pilot interface 104B can be used as the load control interface 104. At block 602, upon initialization, built-in test of the load control interface 104 can perform an operational check of the VTOL aircraft 102 by sending a release-load command to the LCS processor 112 to command a release load function as a test. At block 604, a user of the load control interface 104 can command a mode transition from ground stationary, to hover stationary, to hover-manual control. At block 606, the VTOL aircraft 102 can be positioned and the external load 122 can be hooked and lifted by sending a pickup-load command from the load control interface 104 to the LCS processor 112 to command the VTOL aircraft 102 to maneuver over the external load 122 and descend to the external load 122 at block 608 and attach the external load 122, as well as ascending the VTOL aircraft 102 at block 610. At block 612, a mode transition can be commanded from hover-manual control to hover-stationary to enroute as the VTOL aircraft 102 is commanded to a targeted load release site. At block 614, when the VTOL aircraft 102 reaches a targeted load release site, a mode transition can be commanded from enroute to hover stationary to hover-manual control. At block 616, a user of the load control interface 104 can send a drop-off load command to the LCS processor 112 to command the release load function.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system in an aircraft, the system comprising: a vehicle management system (VMS); and
a load control system (LCS) comprising an LCS processor operable to:
receive through a load control interface a plurality of data and load management commands;
transmit the data and load management commands to one or more of: the VMS and the load control interface;
interact with one or more of: the VMS, one or more LCS sensors, and a load capturing interface of the aircraft to automatically execute one of the load management commands, wherein each one of the load management commands includes a sequence of load management subcommands that automate a sequence of discrete functions to control external load maneuvers, wherein the load capturing interface is operable to, in response to the sequence of discrete functions, autonomously capture and release an external load relative to the aircraft using a load capture device; and
report a status of execution of the load management commands to the VMS and the load control interface.

2. The system of claim 1, wherein the load capture device is a cargo hook with a sling attached; and wherein in response to receiving a release-sling command as one of the load management commands, the VMS performs an altitude decrease subcommand based on determining that the aircraft is above an acceptable release height according to one or more aircraft sensors and sends a cargo-hook-open subcommand via the LCS to open the cargo hook upon confirmation from the one or more aircraft sensors that the aircraft is at or below the acceptable release height.

3. The system of claim 1, further comprising: one or more LCS sensors operable to detect one or more parameters of the external load as one or more of: a position of the external load, a weight of the external load, and a distance of the external load below the aircraft.

4. The system of claim 3, wherein in response to receiving a position-over-load command as one of the load management commands, the LCS processor uses the one or more LCS sensors to locate and identify coordinates of the external load; and in response to locating the external load, the LCS processor sends the coordinates of the external load to the VMS to reposition the aircraft over the coordinates of the external load.

5. The system of claim 3, wherein in response to receiving a lift-load command as one of the load management commands, the LCS processor confirms attachment of the load capture device with the external load and sends a completion status that prompts the VMS to command an altitude increase of the aircraft.

6. The system of claim 3, wherein the load capture device is an LCS capture device, and in response to receiving a release-load command as one of the load management commands, the VMS performs an altitude decrease subcommand based on determining that the aircraft is above an acceptable release height and sends a capture-device-open subcommand to the LCS processor upon confirmation from one or more aircraft sensors that the aircraft is at or below the acceptable release height; wherein LCS processor sends the capture-device-open subcommand to the LCS capture device to release the external load.

7. The system of claim 3, wherein in response to receiving a hook-load command one of the load management commands, the VMS performs a decrease altitude subcommand and monitors the LCS for engagement of the load capture device with the external load and the one or more LCS sensors for the position of the external load or other parameters.

8. The system of claim 3, wherein in response to receiving a pickup-load command one of the load management commands, the VMS decomposes the pickup-load command into a pickup load sequence including a position-over-load command, a hook-load command, and a lift-load command, and executes the pickup-load sequence.

9. The system of claim 3, wherein in response to receiving a drop off-load command one of the load management commands while the aircraft possesses the external load, the VMS decomposes the drop off-load command into a drop-off load sequence comprising completing a repositioning sub-command to a pre-determined drop off location and performing a release-sling command or a release-load command.

10. The system of claim 1, wherein the report of the status of execution comprises transmission of one or more of a text message and an encoded status indicator to the load control interface, wherein the load control interface comprises a control station or a pilot interface.

11. A load control interface comprising:
a user interface operable to receive user selections; and
a processing system operable to, detect a user selection of one of a plurality of selectable load management commands associated with an external load of an aircraft, and transmit a selected one of the plurality of selectable load management command to one or more of a load control system (LCS) and a vehicle management system (VMS) of the aircraft based on a detected user selection, wherein the selected one of the plurality of selectable load management commands comprises a sequence of discrete functions that control external load maneuvers to be autonomously performed by one or more of the LCS and the VMS of the aircraft.

12. The load control interface of claim 11, wherein the selectable load management commands comprise one or more of:
a position-over-load command to locate the external load and position the aircraft over coordinates of the external load;
a hook-load command to lower a load capture device of the aircraft and engage the load capture device with the external load;
a lift-load command to confirm attachment of the load capture device with the external load and increase altitude of the aircraft based on confirmation of the attachment of the load capture device with the external load;
a pickup-load command to command execution of a pickup load sequence comprising the position-over-load command, the hook-load command, and the lift-load command;
a release-sling command to open a cargo hook of the aircraft at or below an acceptable release height;
a release-load command to open an LCS capture device of the aircraft at or below the acceptable release height; and
a drop off-load command to command execution of a drop off-load sequence comprising completing a repositioning sub-command to a pre-determined drop off location and performing a release-sling command or a release-load command.

13. The load control interface of claim 11, wherein a status of execution of the selected one of the selectable load management commands that is received from one or more of the LCS and VMS is displayed on the user interface, and the status of execution of the selected one of the plurality of selectable load management commands comprises one or more of a text message and a graphical symbol displayed on the user interface.

14. The load control interface of claim 11, wherein the processing system is operable to receive a mode of operation of the aircraft, command a change in the mode of operation of the aircraft, and modify an aspect of the user interface based on detecting the change in the mode of operation of the aircraft.

15. The load control interface of claim 11, wherein the load control interface is implemented in a control station that is external to the aircraft or is a pilot interface of the aircraft.

* * * * *